United States Patent [19]

Mallet

[11] Patent Number: 4,507,007
[45] Date of Patent: Mar. 26, 1985

[54] YOKE IN PARTICULAR FOR A UNIVERSAL JOINT

[75] Inventor: Bernard Mallet, Limay, France

[73] Assignee: Nadella, Rueil Malmaison, France

[21] Appl. No.: 484,928

[22] Filed: Apr. 14, 1983

[30] Foreign Application Priority Data

Apr. 15, 1982 [FR] France .................. 82 06469

[51] Int. Cl.³ ............................................. F16C 11/06
[52] U.S. Cl. .................................. 403/157; 29/175 A
[58] Field of Search .................... 403/157, 158, 57, 58, 403/74; 29/175 A; 464/134

[56] References Cited

U.S. PATENT DOCUMENTS

| | | | |
|---|---|---|---|
| 3,867,050 | 2/1975 | Nadella | 403/373 |
| 4,334,414 | 6/1982 | Nadella | 403/157 X |
| 4,365,909 | 12/1982 | Nadella | 403/157 |

FOREIGN PATENT DOCUMENTS

| | | |
|---|---|---|
| 2441759 | 6/1980 | France . |
| 2458002 | 12/1980 | France . |
| 2487933 | 2/1982 | France . |
| 2040394 | 8/1980 | United Kingdom . |

Primary Examiner—Andrew V. Kundrat
Attorney, Agent, or Firm—Robert E. Burns; Emmanuel J. Lobato; Bruce L. Adams

[57] ABSTRACT

The yoke is made from a rolled blank or a tube section and comprises a split hub 5 provided with a clamping device 6 formed by wings 7, 8 of the hub. Each of the wings is provided with a bolt aperture and the outer surface 11, 12 of at least one of the wings of the clamping device has, at least around the bolt aperture, a portion rendered planar by compression of the material of the wing.

10 Claims, 6 Drawing Figures

YOKE IN PARTICULAR FOR A UNIVERSAL JOINT

The present invention relates to universal joints and more particularly concerns a yoke for a universal joint, in particular for a universal joint for steering a motor vehicle.

It has already been proposed to make yokes for universal joints of the aforementioned type from blanks of sheet metal or sections of a tube.

These yokes usually comprise a split hub defined by two substantially planar wings forming a clamping means for the hub and each provided with a bolt aperture.

The yoke disclosed in French Pat. No. 2 458 002 comprises a hub whose clamping wings each have in the region of the bolt aperture a boss obtained by the upsetting of the material which is made to project from the outer surface of each wing.

In the case of a so-called "short" yoke, it is sometimes difficult to form a boss on the surface of each wing of the clamping means of the yoke owing to the fact that the remaining support surface is insufficient for supporting the force resulting from the boss-forming operation.

An object of the invention is to overcome this drawback of known yokes by providing a yoke whose clamping wings have outer surfaces which are sufficiently planar to permit a correct application of the head of the clamping bolt and/or the nut for the bolt with no need to produce a boss on the outer surface of the wing.

The invention therefore provides a coupling element, in particular a yoke for a universal joint, made from a rolled blank or a tube section, comprising a split hub provided with clamping means formed by wings of said hub, each wing being provided with a bolt aperture, wherein the outer surface of at least one of the wings of said clamping means has at least around the bolt aperture a portion made planar by compression of the material of the wing.

Further features of the invention will be apparent from the ensuing description with reference to the accompanying drawing which is given soley by way of example and in which.

Figure 1:
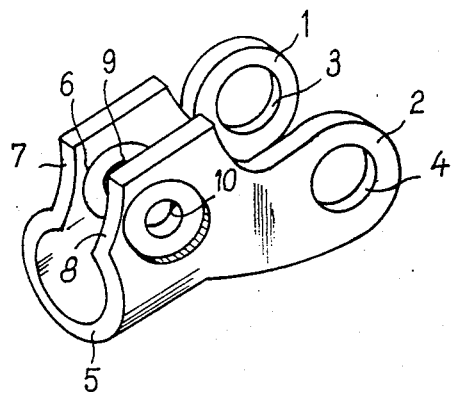
FIG. 1 is a perspective view of a universal joint yoke according to the invention.

The universal yoke shown in FIG. 1 is a yoke made by rolling or coiling a blank of sheet metal, this yoke having branches 1 and 2 each provided with a bore 3, 4 for the corresponding trunnions of a spider element (not shown), and a split hub 5 and clamping means 6 formed by two parallel and planar wings 7 and 8.

The wings 7 and 8 are each provided with an aperture 9, 10 for receiving a bolt for clamping the hub to a shaft (not shown) adapted to receive the hub.

Figure 2:
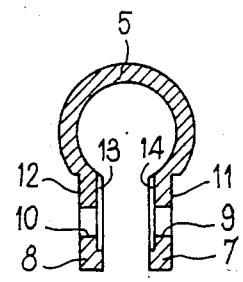
FIG. 2 is a cross-sectional view of the yoke of FIG. 1 through the axes of the bolt apertures of the yoke.

As shown in FIG. 2, the outer surfaces of the wings 7 and 8 have around the bolt apertures 9 and 10 portions 11 and 12 which were rendered planar by a compression of the material of the wing effected on the inner surface of each of the wings. This compression results in an impression 13, 14 on the inner surface of the corresponding wing in alignment with a portion 11, 12 which has thereby been rendered planar.

FIG. 2 shows that the inner impressions 13 and 14 have an area less than the area of the planar outer portions 11, 12. The area of the impression 13 and 14 may, in some cases, be equal to the area of said outer planar portions.

The effect of the inner impressions or cavities 13 and 14 is to produce an improved planar condition of the corresponding outer portions 11, 12 which may be flush with or slightly set back from, the rest of the outer surfaces of the wings 7 and 8.

The fact of achieving a planar surface in the portions 11 and 12 by forming an inner impression in each of the wings permits avoiding the de-burring of the bolt apertures 9, 10 after they have been pierced, since the burrs remain within this recess.

It may sometimes be necessary to re-align the bolt apertures. This re-alignment is achieved by bearing on one of the outer surfaces 11 or 12 of the clamping means, which also ensures a good perpendicularity of the bolt apertures relative to these outer surfaces.

In some cases, a clamping means for a hub must be provided one of the wings of which has its sheet metal thickened, for example for providing a tapped aperture.

Figure 3:
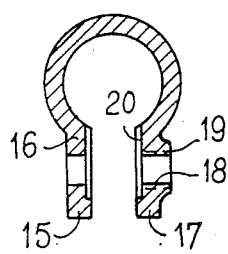
FIG. 3 is a sectional view similar to FIG. 2 of a modification of the yoke for a universal joint according to the invention.

For this purpose and as shown in FIG. 3, the portion of the corresponding wing in which the bolt aperture is to be formed is upset or displaced so as to form an extra thickness whose volume is substantially equal to the volume of the required bolt aperture. The yoke shown in section in FIG. 3 has a wing 15 having an outer portion 16 which has been rendered planar by the compression and the upsetting of material and a wing 17 having around its bolt aperture 18 a spigot 19 obtained by the upsetting and displacement of the material in which the bolt aperture, is to be formed as explained hereinbefore. The height of the spigot may be still further increased by a further compression which produces the impression 20 on the inner side of the wing 17, the diameter of this impression being greater than the outside diameter of the spigot 19.

The spigot formed in this way permits providing a tapped bolt aperture 18 of sufficient length.

In the embodiment described with reference to FIG. 3, the spigot 19 is made on the outer side of the wing 17 of the clamping means.

However, it is also possible to form this spigot on the inner side of a wing of the clamping means, in which case the manner of proceeding given for producing the spigot 19 of FIG. 3 must be reversed, by displacing the material of the bolt aperture from the exterior toward the interior of the wing.

Figure 4:
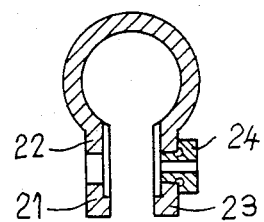
FIG. 4 is a view similar to FIG. 3 of another modification of the yoke according to the invention.

FIG. 4 shows a universal joint yoke whose hub has a clamping means comprising a wing 21 having an outer surface 22 which has been rendered planar, as the outer surfaces of the wings of the embodiment of FIG. 2, and a wing 23 completed with an attached headed nut 24 which is fixed in position in the way which will now be described with reference to FIGS. 4, 5 and 6.

One manner of fixing the nut (FIG. 4) is to make the body portion of the nut 24 a drive fit in the previously-formed aperture 26. The body portion 29 of this nut may be cylindrical, with or without a flat surface, or of hexagonal or notched section.

Another manner of fixing the nut (FIGS. 5 and 6) is to form, before placing the nut 24 in position, an aperture 25 in the wing 21 by the upsetting and displacement of the material of the wing so as to produce in the above described manner a spigot 26 which has in addition a frustoconical outer surface 27. The nut 24 is then inserted in the aperture formed in this way and the nut is set in position by causing the material of the frustoconical end 27 to penetrate an annular groove 28 provided in the region of the shoulder of the head of the nut 24. The assembly shown in FIG. 6 is then obtained.

The body portion 29 of the nut 24 is of smaller section than the head and may be cylindrical, with or without a flat surface, hexagonal or notched in section.

Figure 5:
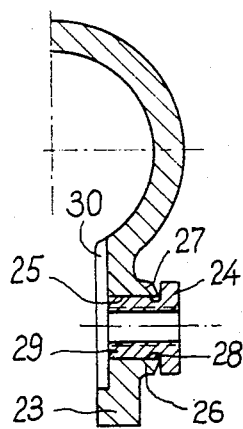
FIGS. 5 and 6 are half-sectional views, to an enlarged scale, of two stages in the production of the yoke shown in FIG. 4.
Figure 6:
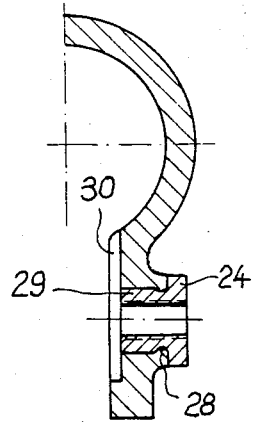

In the embodiment shown in FIGS. 5 and 6, the axial length of the spigot 26 has been increased by compression of the wing 17 resulting in the impression 30 on the inner surface of this wing. This recess is not essential in the case of the fixing of a nut 24 by the aforementioned setting operation. The axial force exerted on the nut may, in certain cases, eliminate the radial clearance between the body of the nut and the aperture adapted to receive it.

Instead of the groove 28, the nut may have a noncircular groove, for example a groove having two flat portions in which the material of the frustoconical end of the spigot, which is axially compressed and held externally, places itself in the setting operation so that the nut is held against rotation in an improved manner.

Although the invention just described is applied to a yoke for a universal joint, it may also be employed for a coupling element of different type, for example a coupling element comprising a split hub of the type described hereinbefore which is connected to at least one fixing tab contained in a plane substantially perpendicular to the axis of the hub.

Having now described my invention what I claim as new and desire to secure by Letters Patent is:

1. A coupling element, in particular a yoke for a universal joint, made from a rolled blank or a tube section, comprising in combination a split hub provided with clamping means formed by two wings of said hub, each wing defining an aperture, the outer surface of one of said wings having at least around the aperture thereof a portion which is rendered planar as a result of a compression of the material of said one wing, the other of said wings of the clamping means comprising around the aperture thereof a spigot in a thickened portion of the wing which thickened portion is the result of an upsetting and displacement of a portion of the material of the wing from an inner side to an outer side of the wing, which upset and displaced portion also contributes to the forming of said aperture.

2. A coupling element according to claim 1, wherein the aperture in the spigot is tapped and constitutes a nut for cooperation with a bolt for clamping the clamping means of the hub.

3. A coupling element according to claim 1, further comprising a nut having a head and a body portion and for cooperation with a bolt for clamping the clamping means of the hub, said body portion being an interference fit in the aperture of said spigot.

4. A coupling element according to claim 1, further comprising a nut having a head and a body portion and for cooperation with a bolt for clamping the clamping means of the hub, said body portion of the nut being fixed in the spigot by interengaging portions on the spigot and the body portion of the nut resulting from a setting operation.

5. A coupling element according to claim 4, wherein said interengaging portions comprise an end portion of the spigot engaged in a peripheral recessed portion in the body portion of said nut.

6. A coupling element according to claim 5, wherein said recessed portion is a groove provided in the body portion adjacent to a shoulder of said nut defined between the body portion and the head.

7. A coupling element according to claim 5, wherein said recessed portion is a flat surface provided in the body portion adjacent to a shoulder of said nut defined between the body portion and the head.

8. A coupling element, in particular a yoke for a universal joint, made from a rolled blank or a tube section of ductile material, comprising a split hub and two integral wings extending from the hub and approximately parallel with one another, said wings having aligned bolt apertures therein, material around said aperture in one of said wings being compressed in a direction perpendicular to said one wing to form an annular recess surrounding said aperture on the inner face of said one wing and a planar surface surrounding said aperture on the outer face of said one wing, and material of said aperture in the other of said wings is upset and displaced to form a thickened spigot portion surrounding said aperture on the outer face of said other wing and an annular recess surrounding said aperture on the inner face of said other wing.

9. A coupling element according to claim 8, in which said spigot is tapped.

10. A method of making a coupling element, in particular a yoke for a universal joint, which comprises forming from a rolled blank or a tube section a split hub provided with clamping wings having aligned bolt apertures compressing the material around the bolt aperture of one wing to form an annular recess around the respective bolt aperture on the inner face of said one wing and to render the outer surface of said one wing around said bolt aperture planar, and displacing material of said bolt aperture in the other of said wings to the outer side of said other wing to form an outwardly projecting spigot in a thickened portion of said other wing and an annular recess around said aperture on the inner face of said other wing.

* * * * *